(12) United States Patent
Barsness et al.

(10) Patent No.: US 10,587,666 B2
(45) Date of Patent: *Mar. 10, 2020

(54) LOCKING STREAMING OPERATORS

(71) Applicant: International Business Machines Corporation, Armonk, NY (US)

(72) Inventors: Eric L. Barsness, Pine Island, MN (US); Daniel E. Beuch, Rochester, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/807,279

(22) Filed: Nov. 8, 2017

(65) Prior Publication Data
US 2018/0352016 A1    Dec. 6, 2018

Related U.S. Application Data

(63) Continuation of application No. 15/608,841, filed on May 30, 2017.

(51) Int. Cl.
*H04L 29/06* (2006.01)
*H04L 12/24* (2006.01)
(Continued)

(52) U.S. Cl.
CPC ........ *H04L 65/605* (2013.01); *G06F 16/9024* (2019.01); *H04L 41/0816* (2013.01);
(Continued)

(58) Field of Classification Search
CPC .......... G06F 16/24568; G06F 16/2343; H04L 41/0816; H04L 29/08135
See application file for complete search history.

(56) References Cited

U.S. PATENT DOCUMENTS 9,038,041 B2    5/2015  Salz et al.
2010/0106946 A1    4/2010  Imaki et al.
(Continued)

OTHER PUBLICATIONS

Barsness et al., "Locking Streaming Operators" U.S. Appl. No. 15/608,841, filed May 30, 2017.
(Continued)

*Primary Examiner* — Austin J Moreau
(74) *Attorney, Agent, or Firm* — Martin & Associates, LLC; Derek P. Martin

(57) ABSTRACT

An operator locking tool allows a user to define a lock profile for one or more operators in a streaming application. The lock profile preferably specifies lock criteria and one or more corresponding lock actions that are taken when the lock criteria is satisfied. The lock criteria can include operator performance, resource utilization, events, and user-defined triggers. The lock actions can include blocking tuple entry, blocking tuple exit, halting tuple processing, processing high-priority tuples while not processing other tuples, allowing tuples to exit an operator only when specified exit criteria is satisfied, and enabling bypass of an operator. Locking can be done for individual operators or for a group of operators.

12 Claims, 5 Drawing Sheets

(51) Int. Cl.
*G06F 16/901* (2019.01)
*H04L 12/26* (2006.01)

(52) U.S. Cl.
CPC ...... *H04L 41/0896* (2013.01); *H04L 43/0817* (2013.01); *H04L 65/60* (2013.01)

(56) References Cited

U.S. PATENT DOCUMENTS

| | | | |
|---|---|---|---|
| 2013/0031124 A1* | 1/2013 | Santosuosso | G06F 16/28 707/769 |
| 2015/0207749 A1* | 7/2015 | Cao | G06F 16/24568 709/226 |
| 2015/0227415 A1 | 8/2015 | Alves et al. | |

OTHER PUBLICATIONS

IBM, Appendix P—List of IBM Patents or Patent Applications Treated As Related, dated Feb. 1, 2018.

* cited by examiner

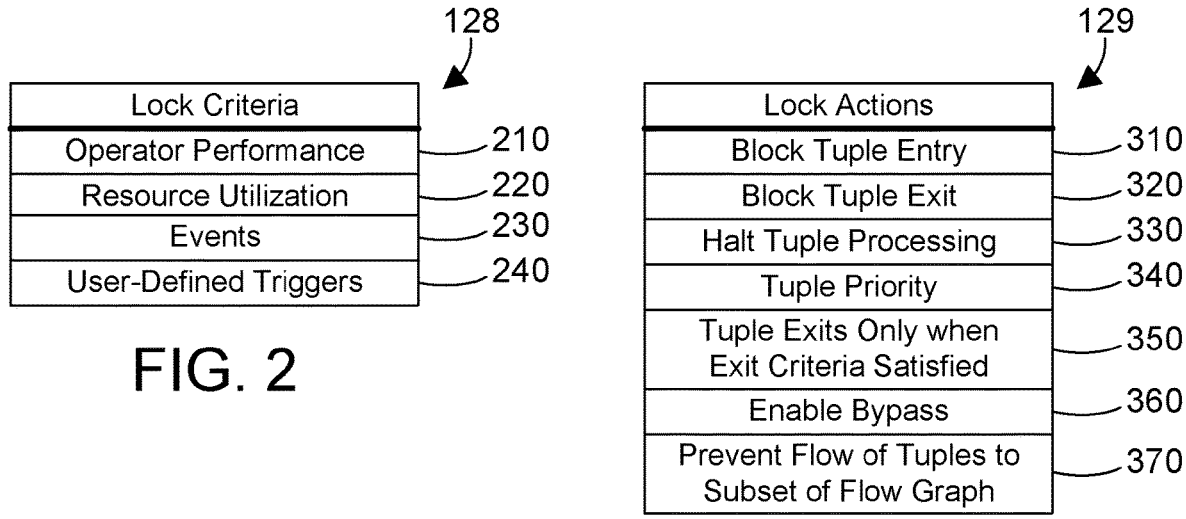
FIG. 2
FIG. 3
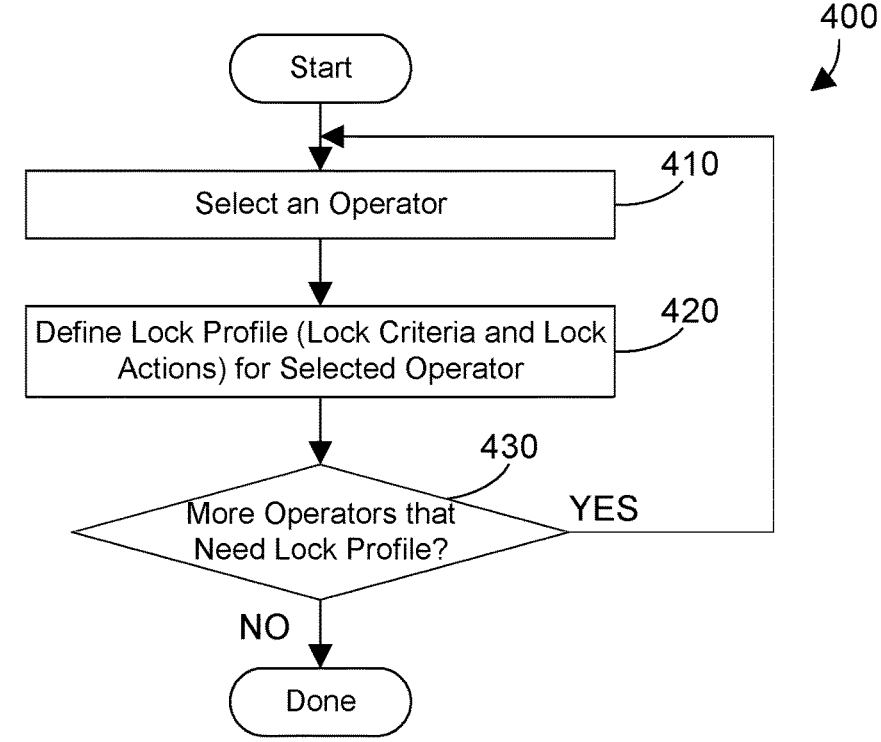
FIG. 4

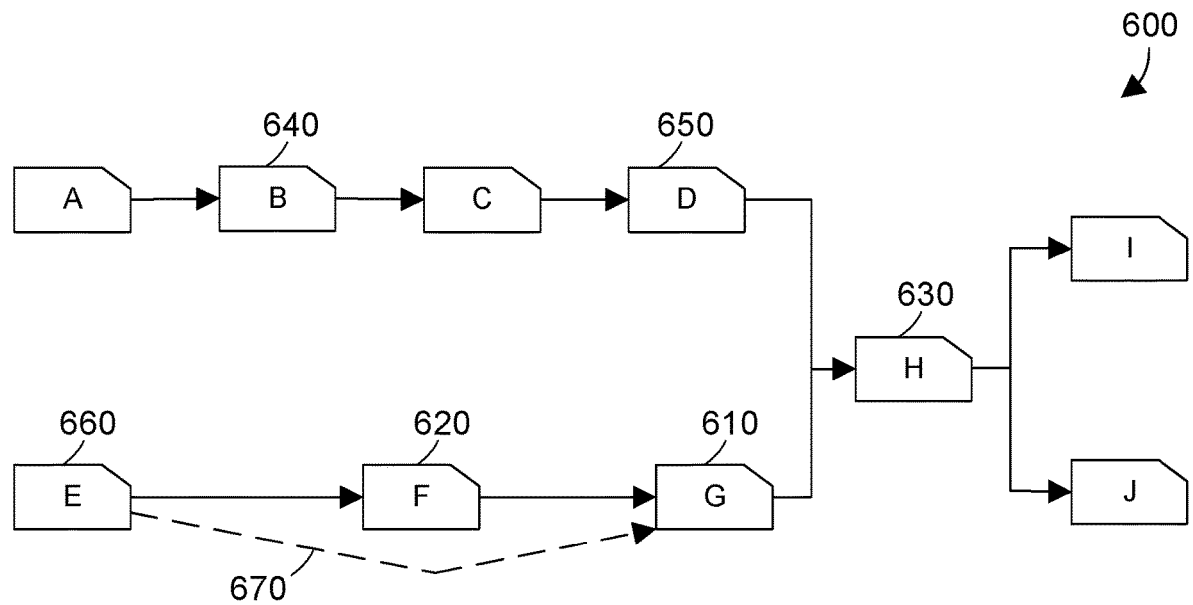
FIG. 6
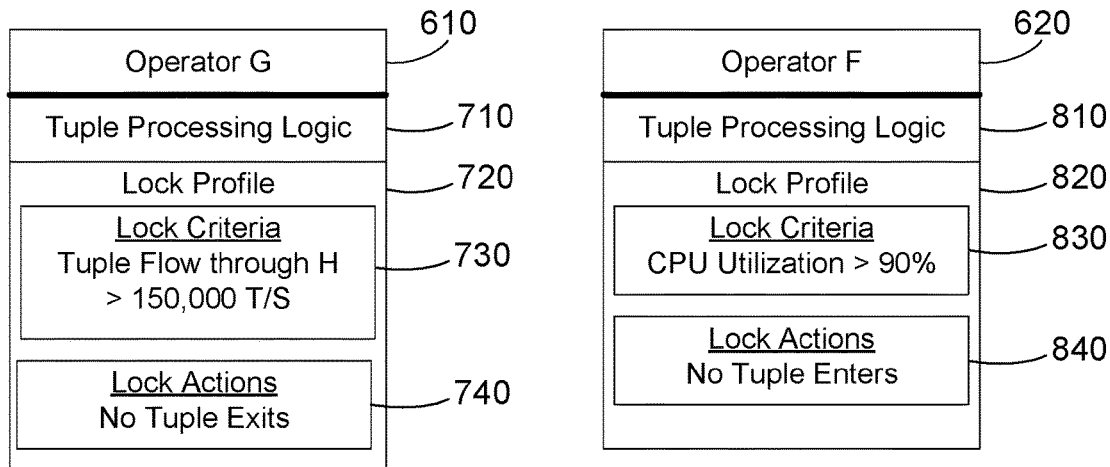
FIG. 7
FIG. 8

LOCKING STREAMING OPERATORS

BACKGROUND

1. Technical Field

This disclosure generally relates to streaming applications, and more specifically relates to locking of streaming operators in streaming applications.

2. Background Art

Streaming applications are known in the art, and typically include multiple operators coupled together in a flow graph that process streaming data in near real-time. An operator typically takes in streaming data in the form of data tuples, operates on the data tuples in some fashion, and outputs the processed data tuples to the next processing element. Streaming applications are becoming more common due to the high performance that can be achieved from near real-time processing of streaming data.

Locking in a database context is known. For example, a table in a relational database can be locked so the table cannot be modified until it is unlocked. This is useful when a process needs to access a database table while assuring no other process can modify the table. The principles of locking a database table with static data cannot be easily applied to a streaming environment because data tuples are transitory and travel from one operator to the next in the streaming application.

BRIEF SUMMARY

An operator locking tool allows a user to define a lock profile for one or more operators in a streaming application. The lock profile preferably specifies lock criteria and one or more corresponding lock actions that are taken when the lock criteria is satisfied. The lock criteria can include operator performance, resource utilization, events, and user-defined triggers. The lock actions can include blocking tuple entry, blocking tuple exit, halting tuple processing, processing high-priority tuples while not processing other tuples, allowing tuples to exit an operator only when specified exit criteria is satisfied, and enabling bypass of an operator. Locking can be done for individual operators or for a group of operators.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a table showing possible items that could be specified in lock criteria for a lock profile for an operator;

FIG. 3 is a table showing possible items that could be specified in lock actions for a lock profile for an operator;

FIG. 4 is a flow diagram of a method for defining lock profiles for operators in a streaming application;

FIG. 6 is a flow diagram of a sample streaming application;

FIG. 7 is a block diagram showing possible features of Operator G shown in FIG. 6;

FIG. 8 is a block diagram showing possible features of Operator F shown in FIG. 6;

DETAILED DESCRIPTION

The disclosure and claims herein are directed to an operator locking tool that allows a user to define a lock profile for one or more operators in a streaming application. The lock profile preferably specifies lock criteria and one or more corresponding lock actions that are taken when the lock criteria is satisfied. The lock criteria can include operator performance, resource utilization, events, and user-defined triggers. The lock actions can include blocking tuple entry, blocking tuple exit, halting tuple processing, processing high-priority tuples while not processing other tuples, allowing tuples to exit an operator only when specified exit criteria is satisfied, and enabling bypass of an operator. Locking can be done for individual operators or for a group of operators.

Figure 1:
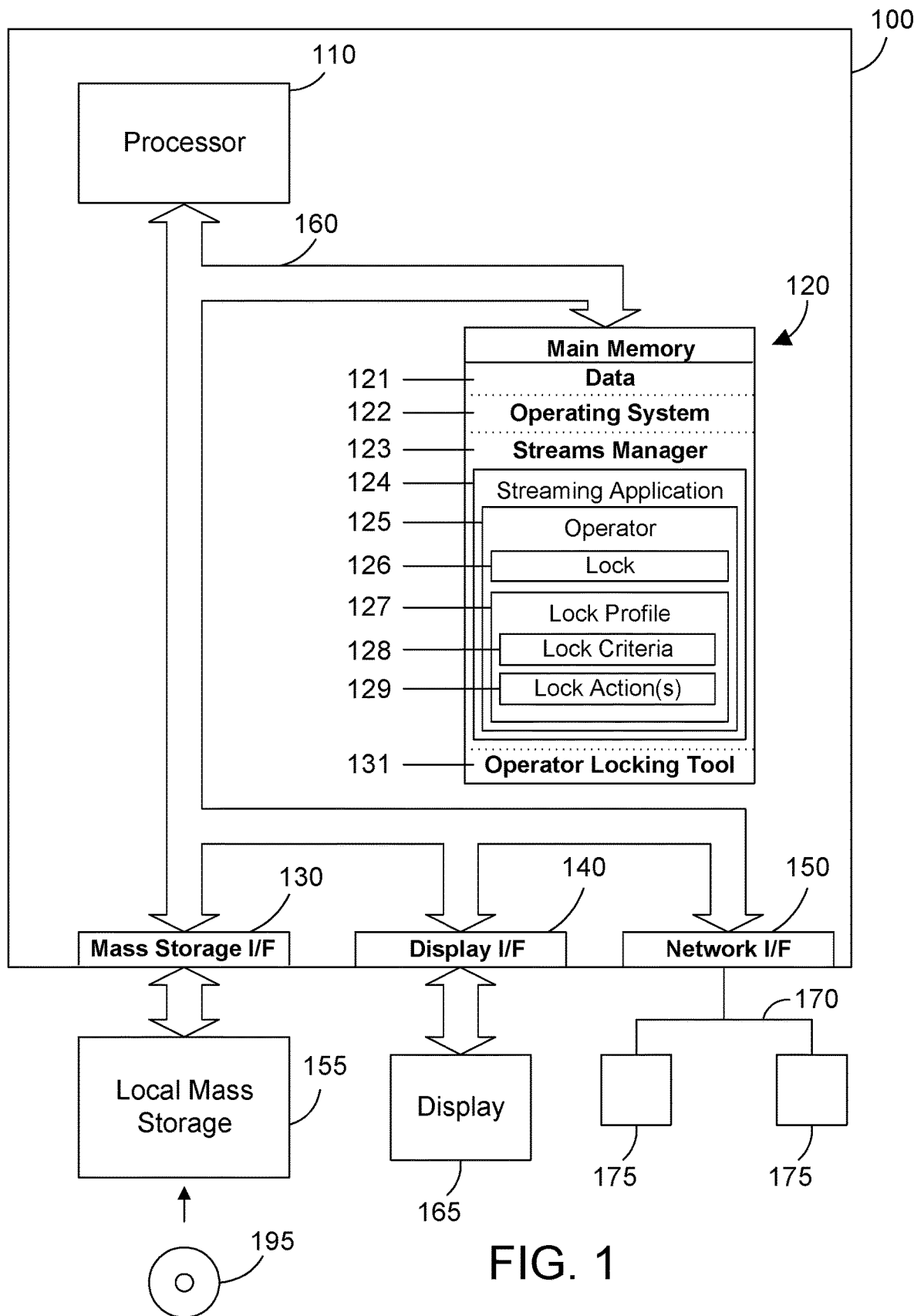
FIG. 1 is a block diagram of a computer system that includes an operator locking tool for locking one or more operators in a streaming application.

Referring to FIG. 1, a computer system 100 is one suitable implementation of a server computer system that includes an operator locking tool as described in more detail below. Server computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive.

Main memory 120 preferably contains data 121, an operating system 122, a streams manager 123, and an operator locking tool 131. Data 121 represents any data that serves as input to or output from any program in computer system 100. Operating system 122 is a multitasking operating system, such as AIX or LINUX. The streams manager 123 is software that provides a run-time environment that executes a streaming application 124. The streaming application 124 preferably comprises a flow graph that includes processing elements that include operators that process data tuples. One such operator 125 is shown in FIG. 1. Operator 125 is different than streaming operators known in the art because it contains a lock 126 and a lock profile 127 that specifies lock criteria 128 and lock actions 129. The lock 126 is used to lock and unlock the operator 125 in defined ways, as discussed in more detail below. The lock profile 127 specifies lock criteria 128 that determine when the lock 126 in the operator 125 is locked and unlocked. Lock actions 129 specify one or more actions that are taken as a result of the lock criteria 128 being satisfied. The operator locking tool 131 is software that provides a way to lock and unlock the lock 126 in an operator 125 according to the lock profile 127 for the operator.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, streams manager 123 and operator locking tool 131 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, and executes the operator locking tool 131.

Although computer system 100 is shown to contain only a single processor and a single system bus, those skilled in the art will appreciate that an operatory locking tool as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 2 shows some examples of items that could be included in the lock criteria 128 shown in FIG. 1. Lock criteria 128 can include operator performance 210. Operator performance could be specified in any suitable way, and may include, for example, tuple flow rate, number of tuples in the operator's input buffer, number of tuples in the operator's output buffer, average time to process a tuple, minimum time to process a tuple, maximum time to process a tuple, amount of memory used by an operator, and amount of CPU used by an operator. For example, when the tuple flow rate within an operator or at any suitable location in the streaming application exceeds a tuple flow rate specified in the lock criteria, the operator can be locked. Similarly, when the number of tuples in the operator's input buffer exceeds some threshold specified in the lock criteria, the operator can be locked. Likewise, when the number of tuples in the operator's output buffer exceeds some threshold specified in the lock criteria, the operator can be locked. Other things that measure or define operator performance 210 could also be used as part of the lock criteria 128.

Resource utilization 220 can include any suitable threshold, algorithm or heuristic related to resource usage by one operator, by a specified group of operators, or by the entire streaming application. Examples of resource utilization include CPU utilization, memory utilization, input/output (I/O) utilization, disk utilization, and network utilization. Events 230 can include any events in the streaming application that can be detected by the streams manager. Examples of events 230 could include a data tuple with a specified value. Other events 230 could be defined based on monitored metrics of an operator reaching a specified threshold, number of exceptions an operator experiences, tuple droprates, congestion of the operator, and events such as the starting of a job, the termination of a job, etc. Lock criteria 128 can also include user-defined triggers 240, which can be any suitable combination of tuple data values or ranges, tuple metadata values or ranges, or any logical expression or heuristic that can include one or more of the operator performance 210, resource utilization 220 and events 230. Lock criteria 128 broadly encompasses any suitable criteria or condition in any single operator or groups of operators, including the entire streaming application, that could be used to determine when to lock and unlock an operator.

FIG. 3 shows some examples of items that could be included in the lock actions 129 shown in FIG. 1. Lock actions 129 can include blocking tuple entry to an operator 310; blocking tuple exit 320; halting tuple processing 330; tuple priority 340; specifying that a tuple exits only when a specified exit criteria is satisfied 350; enable bypass 360; and prevent flow of tuples to a subset of the flow graph 370. Block tuple entry 310, when specified as a lock action, blocks tuples from entering an operator. Block tuple exit 320, when specified as a lock action, blocks tuples from exiting an operator. Halt tuple processing 330 halts the process executing the operator logic. Note that halt tuple processing 330 could specify, for example, to complete processing current tuples being processed by an operator but not processing any new tuples. Tuple priority 340 is a way to specify a priority level for data tuples. The priority level could be specified in metadata related to the data tuple. This allows essentially tagging some data tuples as higher priority than other data tuples, and when tuple priority is a specified lock action, the operator allows high priority data tuples to enter, be processed, and exit, while not processing lower priority data tuples.

The lock actions 129 can include specifying an exit criteria for data tuples, and only allowing a data tuple to exit an operator when the data tuple satisfies the exit criteria 350. The exit criteria can be defined in any suitable way. For example, the exit criteria could specify a minimum number of iterations that a tuple must be processed by an operator, such as ten. With an exit criteria of ten iterations, a data tuple will have metadata that specifies a number of times through the operator, with the metadata being incremented with each pass through the operator. Once the metadata that specifies the number of iterations reaches ten, the data tuple is allowed to exit the operator. In another example, there could be multiple lock levels defined that are a function of conditions in the streaming application. A lock level can be represented in the metadata for the data tuple. In one specific example, a lock level is increased the longer a data tuple is within an operator. This aging process allows data tuples that have been in the operator the longest to exit while retaining other operators that have not been in the operator as long. The disclosure and claims herein expressly extend to any suitable exit criteria for determining when a data tuple can or cannot exit an operator.

Figure 12:
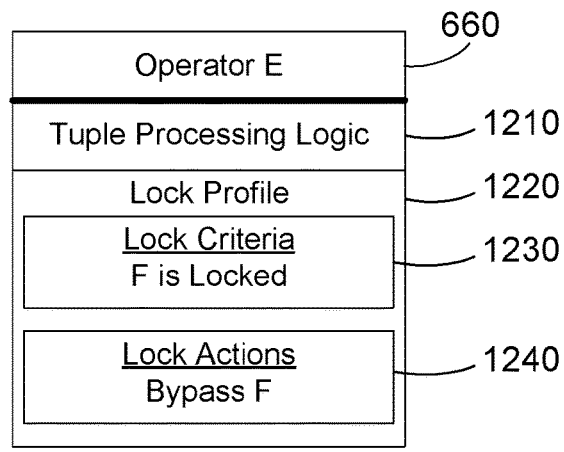
FIG. 12 is a block diagram showing possible features of Operator E shown in FIG. 6.

The lock actions 129 also include enabling bypass of a locked operator 360. This allows an operator to be notified when a downstream operator is locked, and to bypass the downstream operator when it is locked. Note the metadata for the data tuple can indicate which operator was bypassed, or which data in the data tuple is missing or not valid due to the bypass. Any example of bypassing an operator is shown in FIGS. 6 and 12, as explained in more detail below. The lock actions 129 also include preventing flow of data tuples to a subset of the flow graph 370.

Referring to FIG. 4, a method 400 is preferably performed by a human user such as a programmer or a system administrator to define lock profiles for operators in a streaming application, such as 127 in FIG. 1. An operator is selected (step 410). A lock profile for the selected operator is defined (step 420), which includes defining lock criteria and one or more lock actions for the selected operator when the lock criteria is satisfied. When there are more operators that need a lock profile (step 430=YES), method 400 loops back to step 410 and continues until no more operators need a lock profile (step 430=NO), at which point method 400 is done.

Figure 5:
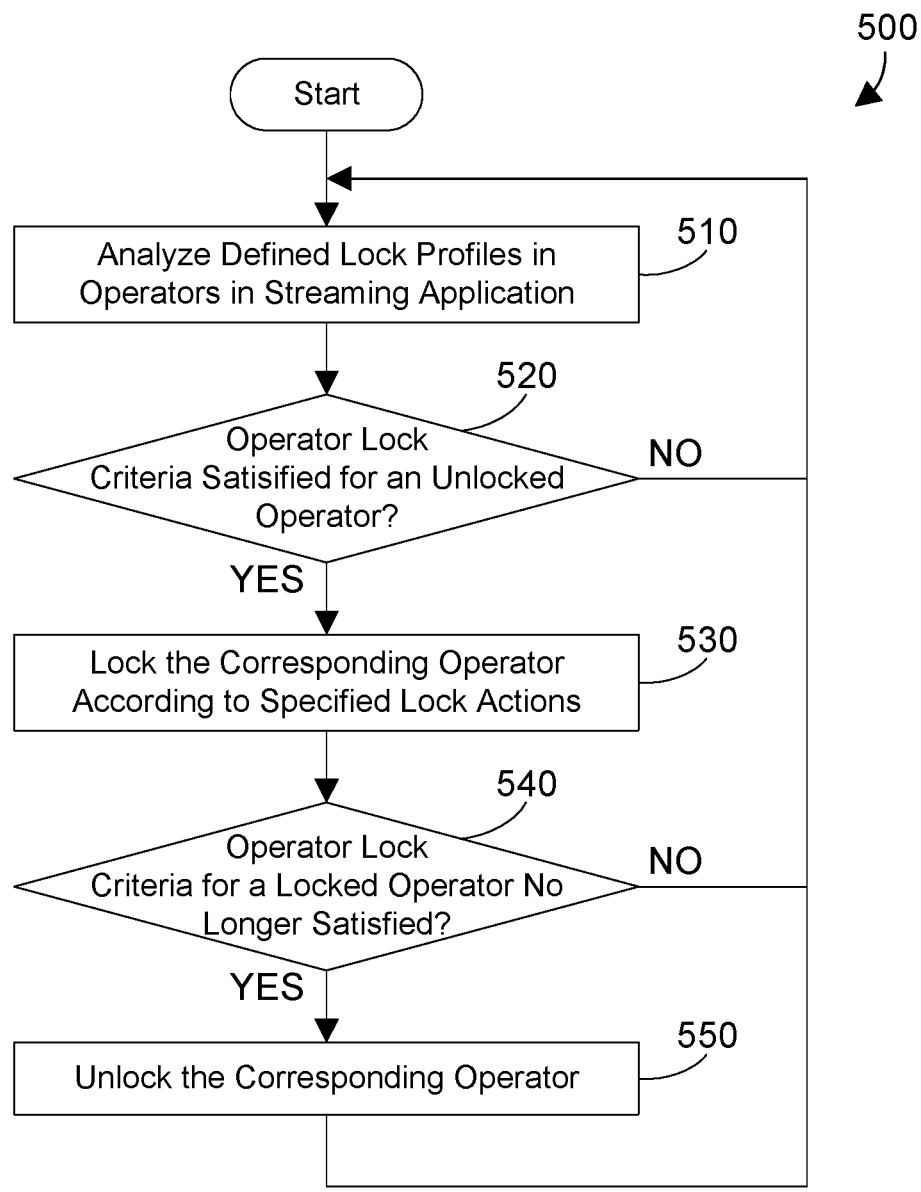
FIG. 5 is a flow diagram of a method for locking and unlocking operators in a streaming application.

Referring to FIG. 5, a method 500 is preferably performed by the operator locking tool 131 shown in FIG. 1. The defined lock profiles in operators in the streaming application are analyzed (step 510). When there is no operator lock criteria satisfied for an operator that is currently unlocked (step 520=NO), method 500 loops back to step 510 and continues until operator lock criteria is satisfied for an unlocked operator (step 520=YES). The corresponding operator is locked according to the specified lock actions in the operator (step 530). When the operator lock criteria for a locked operator is no longer satisfied (step 540=YES), the corresponding operator is unlocked (step 550). Method 500 iterates so that locking and unlocking of operators is done dynamically as conditions in the operators or streaming application change.

Referring to FIG. 6, an extremely simplified streaming application 600 is shown for the purposes of illustrating the concepts herein. The streaming application 600 includes ten operators A, B, C, D, E, F, G, H, I and J. Operator A produces data tuples that are sent to operator B. Operator B operates on the data tuples received from operator A and sends the resulting data tuples to operator C. Operator C operates on the data tuples received from operator B and sends the resulting data tuples to operator D. In similar fashion, operator E produces data tuples that are sent to operator F, which processes those data tuples and sends resulting data tuples to operator G. Operators D and G both send their data tuples to operator H, which processes these data tuples and sends some data tuples to operator I and other data tuples to operator J. We assume for this simple example that streaming application 600 processes streaming data for internet protocol (IP) telephone calls.

We now show several examples in FIGS. 7-12 that illustrate some of the general concepts discussed above. Operator G in FIG. 6 is shown in more detail in FIG. 7 to include tuple processing logic 710, and a lock profile 720 that includes a specific lock criteria 730 and a corresponding lock action 740. Tuple processing logic 710 includes the logic to receive an input data tuple, process the input data tuple in some defined way, and output the processed data tuple. Tuple processing logic 710 necessarily includes logic that supports processing of data tuples when the operator 610 is unlocked and that supports locking of the operator, along with any needed processing while the operator 610 is locked. The lock criteria 730 specifies to lock operator G 610 when the tuple flow rate through operator H is greater than 150,000 tuples per second. This example shows how an operator can be locked based on conditions outside the operator, such as tuple flow rate through a different operator. We see from FIG. 6 that operator H 630 receives tuples from operator D 650 and operator G 610. We further assume the processing of tuples in operators A, B, C and D has a higher priority than the processing of tuples in operators E, F and G. The lock criteria 730 recognizes a tuple rate in operator H 630 that exceeds 150,000 tuples per second, which we assume indicates that operator H is having a hard time keeping up with incoming tuples, and in response, the operator lock tool locks operator G 610 such that no tuple exits operator G 610. As shown in FIG. 6, by locking operator G 610 so no tuple exits operator G, operator H will only receive tuples from operator D 650, which will give operator H time to process the tuples received from operator D 650. Once the tuple flow rate through operator H drops below 150,000 tuples per second specified in the lock criteria 730, the operator locking tool unlocks operator G 610. Note the operator locking tool can build in hysteresis into the lock criteria to avoid locking and unlocking operators too frequently. For example, for the lock criteria of 150,000 tuples per second through operator H as shown at 730 in FIG. 7, the operator locking tool can lock operator G once the tuple flow rate in operator H exceeds 150,000 tuples per second for a specified time period, such as two seconds, and can then build in 10% hysteresis so that operator G is not unlocked until the tuple flow rate through H drops to less than 90% of the specified threshold, namely, 135,000 tuples per second for a specified time period.

Operator F 620 in FIG. 6 is shown in more detail in FIG. 8 to include tuple processing logic 810 and a lock profile 820 that includes lock criteria 830 and a corresponding lock action 840. Tuple processing logic 810 includes the logic to receive an input data tuple, process the input data tuple in some defined way, and output the processed data tuple. Tuple processing logic 810 necessarily includes logic that supports processing of data tuples when the operator 620 is unlocked and that supports locking of the operator, along with any needed processing while the operator 620 is locked.

The lock criteria 830 in this example is when CPU utilization exceeds 90%, and the corresponding lock action 840 is for no tuple to enter operator F once it is locked. In this example, the processing in operator F is much less important than the processing in operators A, B, C and D, so when CPU utilization exceeds 90% for some specified time period, the operator locking tool will lock operator F so no tuple enters operator F. Because the lock actions 840 do not specify to halt processing by operator F and does not specify that no tuple can exit, operator F, once locked, can continue to process data tuples it was working on at the time operator F was locked until those data tuples are output, and may additionally process all data tuples in its input buffer until those data tuples are output as well. Once the CPU utilization drops below 90% for a specified time period, or below some hysteresis value less than 90%, the operator locking mechanism unlocks operator F 620.

Figure 9:
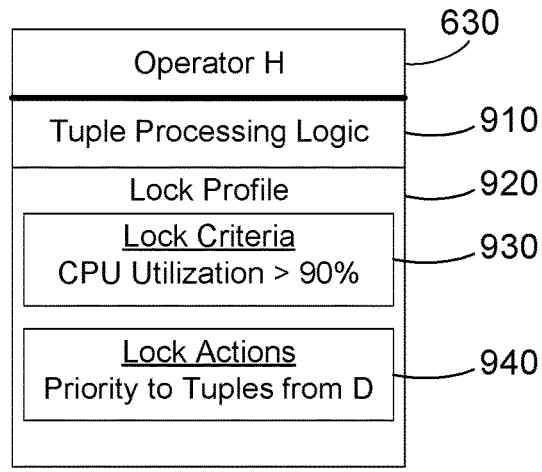
FIG. 9 is a block diagram showing possible features of Operator H shown in FIG. 6.

Operator H 630 in FIG. 6 is shown in more detail in FIG. 9 to include tuple processing logic 910 and a lock profile 920 that includes lock criteria 930 and a corresponding lock action 940. Tuple processing logic 910 includes the logic to receive an input data tuple, process the input data tuple in some defined way, and output the processed data tuple. Tuple processing logic 910 necessarily includes logic that supports processing of data tuples when the operator 630 is unlocked and that supports locking of the operator, along with any needed processing while the operator 630 is locked. The lock criteria 930 in this example is when CPU utilization exceeds 90%, similar to lock criteria 830 in FIG. 8. The corresponding lock action 940 specifies to give priority processing to tuples from operator D. FIG. 6 shows operator H receives data tuples from operator D 650 and operator G 610. We assume the data tuples processed by operators A, B, C and D have a higher priority than data tuples processed by operators E, F and G. Thus, when CPU utilization exceeds 90% for a specified period of time, the operator locking tool locks operator H 630 such that operator H 630 processes operators from operator D 650 before processing tuples from operator G 610. Once the CPU utilization drops below 90% for a specified time period, or below some hysteresis value less than 90%, the operator locking mechanism unlocks operator H 630.

Figure 10:
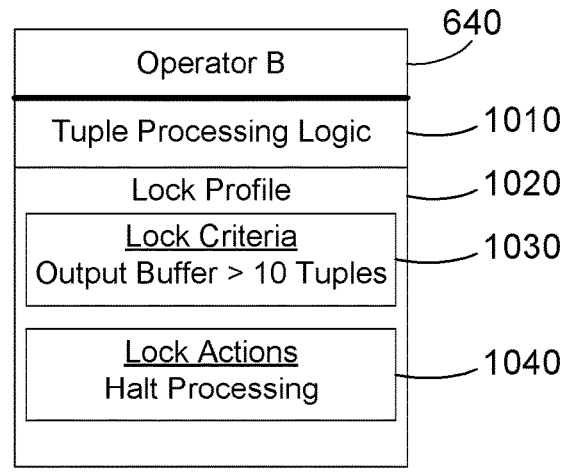
FIG. 10 is a block diagram showing possible features of Operator B shown in FIG. 6.

Operator B 640 in FIG. 6 is shown in more detail in FIG. 10 to include tuple processing logic 1010 and a lock profile 1020 that includes lock criteria 1030 and a corresponding lock action 1040. Tuple processing logic 1010 includes the logic to receive an input data tuple, process the input data tuple in some defined way, and output the processed data tuple. Tuple processing logic 1010 necessarily includes logic that supports processing of data tuples when the operator 640 is unlocked and that supports locking of the operator, along with any needed processing while the operator 640 is locked. The lock criteria 1030 specifies that when the output buffer in operator B has more than 10 data tuples, the corresponding lock action 1040 is performed, meaning the processing of data tuples by operator B is halted. Halting the processing of data tuples by operator B will give time for the data tuples in its output buffer to output to operator C, allowing the output buffer to be reduced or cleared. Once the output buffer has less than ten tuples, or less that some other threshold value, the operator locking mechanism unlocks operator B 640, which allows processing of data tuples by operator B 640 to resume.

Figure 11:
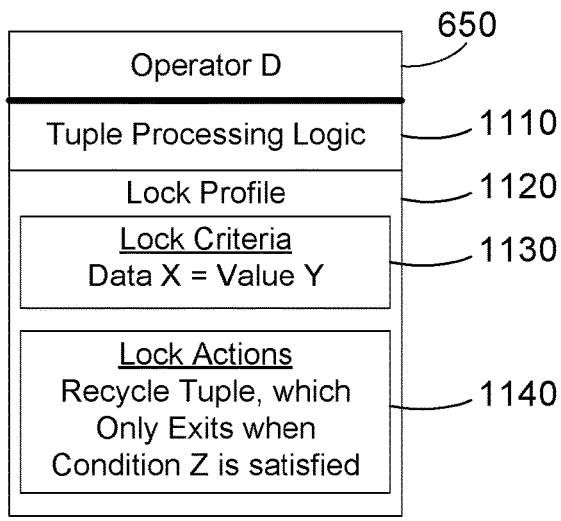
FIG. 11 is a block diagram showing possible features of Operator D shown in FIG. 6.

Operator D 650 in FIG. 6 is shown in more detail in FIG. 11 to include tuple processing logic 1110 and a lock profile 1120 that includes lock criteria 1130 and lock actions 1140. Tuple processing logic 1110 includes the logic to receive an input data tuple, process the input data tuple in some defined way, and output the processed data tuple. Tuple processing logic 1110 necessarily includes logic that supports processing of data tuples when the operator 650 is unlocked and that supports locking of the operator, along with any needed processing while the operator 650 is locked. The lock criteria 1130 specifies that when data in a tuple has a specified value, the corresponding lock actions 1140 are performed, which means the data tuple will be recycled to the input of operator D and will be processed again by operator D, and will only exit operator D when some condition Z is satisfied. The lock criteria could be, for example, checking to see if a tuple has a particular telephone number. Condition Z can be an exit criteria as discussed above with reference to 350 in FIG. 3 above. Operator D can thus be locked such that it repeatedly recycles and processes data tuples until the exit condition Z is satisfied. Once the data tuple exits, the lock criteria is no longer satisfied because the data tuple that satisfies the lock criteria has been output to the next operator, so the operator locking mechanism unlocks operator D 650, which continues processing data tuples normally. The specific example in FIG. 11 shows how the lock profile can be defined in a way that locks the operator to provide specialized processing for a specified data tuple or type of data tuple, and once the data tuple has exited operator D, the operator is unlocked. This example thus illustrates locking an operator during processing of a single data tuple.

Operator E 660 in FIG. 6 is shown in more detail in FIG. 12 to include tuple processing logic 1210 and a lock profile 1220 that includes lock criteria 1230 and a corresponding lock action 1240. Tuple processing logic 1210 includes the logic to receive an input data tuple, process the input data tuple in some defined way, and output the processed data tuple. Tuple processing logic 1210 necessarily includes logic that supports processing of data tuples when the operator 660 is unlocked and that supports locking of the operator, along with any needed processing while the operator 660 is locked. Lock criteria 1230 specifies that when operator F is locked, operator E can bypass F. Referring to FIG. 6, this means a lock in operator F 620 can cause operator E to change how it processes data tuples by outputting the data tuples directly to operator G 610, as shown by the dotted line 670 in FIG. 6. Once operator F is unlocked, the operator locking tool unlocks operator E, meaning operator E will output its tuples to operator F 620 again instead of bypassing operator F 620.

The examples discussed herein show locking an operator and unlocking an operator. Note, however, the operator does not have to be "locked" in some academic sense of not accepting data tuples, not outputting data tuples, or not processing data tuples. The examples in FIGS. 9, 11 and 12 illustrate that locking an operator simply means, in the broadest sense, the function of the operator is changed. The disclosure and claims herein expressly extend to any suitable change for operators based on when the operator is locked and unlocked, as illustrated by the specific examples herein.

While the specific examples herein relate to the locking of a single operator, a lock profile could be defined for a group of operators such that all operators in the group are locked and unlocked at the same time according to the lock criteria specified in the lock profile. The disclosure and claims herein extend to locking a single operator and locking a group of operators.

The examples provided herein are extremely simplified to illustrate the general concepts of locking and unlocking operators according to a lock profile that includes lock criteria and one or more corresponding lock actions. Most streaming applications are significantly more complex than shown in the example herein. However, one skilled in the art will appreciate the concepts disclosed and claimed herein can extend to a streaming application of any suitable level of complexity with any suitable number operators and corresponding lock profiles. In addition, the terms "tuple" and "data tuple" as used herein are synonyms.

An operator locking tool allows a user to define a lock profile for one or more operators in a streaming application. The lock profile preferably specifies lock criteria and one or more corresponding lock actions that are taken when the lock criteria is satisfied. The lock criteria can include operator performance, resource utilization, events, and user-defined triggers. The lock actions can include blocking tuple entry, blocking tuple exit, halting tuple processing, processing high-priority tuples while not processing other tuples, allowing tuples to exit an operator only when specified exit criteria is satisfied, and enabling bypass of an operator. Locking can be done for individual operators or for a group of operators.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streams manager residing in the memory and executed by the at least one processor, the streams manager executing a streaming application that comprises a flow graph that includes a plurality of operators that process a plurality of data tuples, wherein a first of the plurality of operators comprises a lock, and a lock profile that specifies lock criteria for the first operator and at least one corresponding lock action for the first operator; and
   an operator locking tool residing in the memory and executed by the at least one processor that determines when the lock criteria for the first operator is satisfied, and in response, sets the lock in the first operator, causing the first operator to perform the at least one corresponding lock action.

2. The apparatus of claim 1 wherein the lock criteria specifies operator performance.

3. The apparatus of claim 2 wherein the operator performance comprises at least one of:
   a number of data tuples in an input buffer of the first operator;
   a number of tuples in an output buffer of the first operator; and
   a rate of processing data tuples by the first operator.

4. The apparatus of claim 1 wherein the lock criteria specifies resource utilization.

5. The apparatus of claim 4 wherein the resource utilization comprises at least one of:
   CPU utilization;
   memory utilization;
   network utilization;
   input/output (I/O) utilization; and
   disk utilization.

6. The apparatus of claim 1 wherein the lock criteria specifies an event in the streaming application and the at least one corresponding locking action comprises preventing flow of data tuples into a subset of the plurality of operators in the flow graph.

7. The apparatus of claim 1 wherein the lock criteria specifies at least one user-defined trigger and the at least one corresponding locking action comprises preventing flow of data tuples into a subset of the plurality of operators in the flow graph.

8. The apparatus of claim 1 wherein the corresponding lock action comprises at least one of:
   blocking tuple entry to the first operator;
   blocking tuple exit from the first operator; and
   halting tuple processing by the first operator.

9. The apparatus of claim 1 wherein the corresponding lock action comprises at least one of:
   data tuple priority for the first operator;
   data tuple exits the first operator only when a specified exit criteria is satisfied; and
   enable bypass of a locked operator.

10. An apparatus comprising:
    at least one processor;
    a memory coupled to the at least one processor;
    a streams manager residing in the memory and executed by the at least one processor, the streams manager executing a streaming application that comprises a flow graph that includes a plurality of operators that process a plurality of data tuples, wherein a first of the plurality of operators comprises a lock profile that specifies lock criteria for the first operator and a plurality of corresponding lock actions for the first operator, wherein the lock criteria comprises a plurality of the following:
      a number of data tuples in an input buffer of the first operator;
      a number of tuples in an output buffer of the first operator;
      a rate of processing data tuples by the first operator;
      CPU utilization;
      memory utilization;
      network utilization;
      input/output (I/O) utilization;
      disk utilization;
      an event in the streaming application; and
      a user-defined trigger in the streaming application;
    wherein the plurality of corresponding lock actions for the first operator comprises a plurality of the following:
      blocking tuple entry to the first operator;
      blocking tuple exit from the first operator; and
      halting tuple processing by the first operator;
    an operator locking tool residing in the memory and executed by the at least one processor that determines when the lock criteria for the first operator is satisfied, and in response, sets the lock in the first operator, causing the first operator to perform the plurality of corresponding lock actions.

11. The apparatus of claim 10 wherein, in response to the lock criteria for the first operator being satisfied, the operator locking tool setting locks in each of a group of operators that includes the first operator, wherein each of the group of operators performs the corresponding lock actions in response to a lock being set.

12. An apparatus comprising:
    at least one processor;
    a memory coupled to the at least one processor;
    a streams manager residing in the memory and executed by the at least one processor, the streams manager executing a streaming application that comprises a flow graph that includes a plurality of operators that process a plurality of data tuples, the plurality of operators comprising:
  a first operator comprising a first lock and a first lock profile, wherein the first lock profile comprises:
    first lock criteria for the first operator comprising a tuple flow rate in excess of a defined threshold through a third operator downstream from the first operator;
    a first lock action that specifies that no tuple exits the first operator when the first lock criteria is satisfied;
  a second operator comprising a second lock and a second lock profile, wherein the second lock profile comprises:
    second lock criteria for the second operator comprising when a fourth operator downstream from the second operator is locked;
    a second lock action that specifies to bypass the fourth operator when the second lock criteria is satisfied;
  an operator locking tool residing in the memory and executed by the at least one processor that determines when the first lock criteria for the first operator is satisfied, and in response, sets the first lock, causing the first operator to perform the first lock action so no tuple exits the first operator; and
  the operator locking tool determining the second lock criteria for the second operator is satisfied, and in response, sets the second lock, causing the second operator to perform the second lock action by bypassing the fourth operator.

* * * * *